United States Patent [19]

Rhoades

[11] Patent Number: 5,187,866
[45] Date of Patent: Feb. 23, 1993

[54] METHOD OF MAKING A CAM SHAFT

[75] Inventor: John P. Rhoades, Mansfield, Ohio

[73] Assignee: Copperweld Corporation, Pittsburgh, Pa.

[21] Appl. No.: 753,726

[22] Filed: Sep. 3, 1991

[51] Int. Cl.$^5$ ................................................. B23C 3/08
[52] U.S. Cl. .................................. 29/888.1; 29/888.08; 74/567
[58] Field of Search .................... 72/370, 392, 393; 74/567; 29/888.1, 888.08, 428

[56] References Cited

U.S. PATENT DOCUMENTS

| | | | |
|---|---|---|---|
| 4,763,503 | 8/1988 | Hughes et al. | 29/888.1 |
| 4,875,270 | 10/1989 | Krips et al. | 29/888.1 |
| 4,926,667 | 5/1990 | Markiewicz et al. | 72/370 |
| 5,040,294 | 8/1991 | Harle | 29/888.1 |
| 5,085,099 | 2/1992 | Hughes | 29/888.1 |
| 5,115,663 | 5/1992 | Ardo et al. | 72/370 |

*Primary Examiner*—Irene Cuda
*Attorney, Agent, or Firm*—Walter J. Blenko, Jr.

[57] ABSTRACT

A cam shaft in which a shaft member is formed by drawing a length of tubing over a mandrel and through a die. A second length of tubing is drawn to a larger diameter and is then shaped to form cam members which are attached to the shaft member. Circular journal members may be formed in the same manner and attached to the shaft member.

4 Claims, 2 Drawing Sheets

METHOD OF MAKING A CAM SHAFT

This invention relates to cam shafts for internal combustion engines and the like. More particularly, it relates to cam shafts which are fabricated from lengths of tubular stock.

The use of cam shafts in various types of machinery is well known. Cam shafts have particular utility in internal combustion engines. Traditionally, a cam shaft consists of a shaft which is journaled for rotation and which has one or more asymmetric portions upon it, each of which constitutes a cam. Each cam is contacted by a cam follower which is caused to move toward and away from the axis of the cam shaft by rotation of the cam shaft and the associated cam. Traditionally, cam shafts have been fabricated by casting or forging a blank which is then machined, ground, and hardened as necessary to form cam surfaces, bearing surfaces, and attachment points for a cam gear.

Various methods have been attempted to overcome the expense and weight of traditional cam shaft designs. Some workers in the art have used powder metallurgy techniques to form cam lobes upon a solid or hollow shaft. It has been proposed to fabricate the cam lobes by powder metallurgy and then to expand a tubular shaft to lock the cam lobes to the cam shaft. Such proposals have produced varying manufacturing problems Moreover, powder metallurgy techniques produce parts lacking in durability for long-term operations. In particular, wear upon the cam surfaces of a cam produced from powdered metal presents a serious problem.

I provide a length of hollow shaft stock having an outside diameter of controlled size. I further provide at least one length of hollow cam stock having a partial inner diameter of controlled size which closely corresponds to the outside diameter of the shaft stock. I attach at least one length of cam stock to the length of shaft stock at a selected position on the shaft stock. I permanently attach each length of cam stock to the shaft stock at a desired position. I may attach the length of cam stock to the shaft stock by welding, or by brazing. I prefer to grind the cam stock to form a smooth cam follower surface. Preferably, the cam surface is hardened to provide adequate resistance to wear.

I may grind the shaft member where it is to be journaled for rotation and may harden the shaft member at that point. Alternatively, I may position a length of circular stock on the shaft to serve as a journal in a bearing which carries the shaft. The journal member is attached to the shaft member in the same manner as one of the cam members. Also, because the circular section is in juxtaposition to the shaft member around its entire circumference, it is possible to attach the journal member to the shaft member by expansion of the shaft member or by shrink fit of the journal member. I further prefer to press fit or to weld a timing gear to the shaft member to drive the cam shaft.

I prefer to form shaft stock by drawing a first tube through a die and over a mandrel to form a tube having an outer diameter whose size is closely controlled. I further form cam stock by drawing a second tube through a die and over a mandrel to form a round tube having a circumference equal to the circumference of the cam member. I refer to such a round section as an "equivalent round" of the cam member Thereafter, I draw the second tube through a forming die and over a mandrel to form a tube having a cross section in the shape of a cam and which includes a partial inner diameter whose size is closely controlled for fitting to the outside diameter of the shaft stock. I may cut sections of convenient length from the cam stock to form a cam member. Thereafter, I place a cam member at each place on the shaft member where it is desired to have a cam. Preferably, I place the shaft member in a fixture which holds both the shaft member and the cam member in fixed relationship until the cam member is permanently attached to the shaft member. After the cam has been properly positioned, I attach the cam member to the shaft member, preferably by welding or brazing.

I may form journal members by drawing a tube through a mandrel and over a forming die and then cutting journal members of convenient length from the tube. I may attach journal members to the shaft by welding, by brazing, by expansion of the shaft member into the cam member or by shrink fit of the cam member onto the shaft member. The journal members may be ground as necessary for size and finish.

Other details, objects, and advantages of my invention will become more apparent as the following description of a present preferred embodiment thereof proceeds.

In the accompanying drawings, I have illustrated a present preferred embodiment of my invention in which.

The cam shaft is formed by assembling a shaft member and one or more cam members attached to the shaft member. Shaft member 1 is a hollow tube having an outside diameter 2 and an inside diameter 3. The shaft member is fabricated by drawing a tube through a die and over a mandrel which produces a tube whose diameter is closely controlled and which has requisite mechanical properties. The shaft may be fabricated from 1050 steel, for example, which is initially formed into welded tubing. When the tubing is drawn through the die and over the mandrel, some reduction and cold working will take place thereby enhancing the physical properties.

Figure 1:
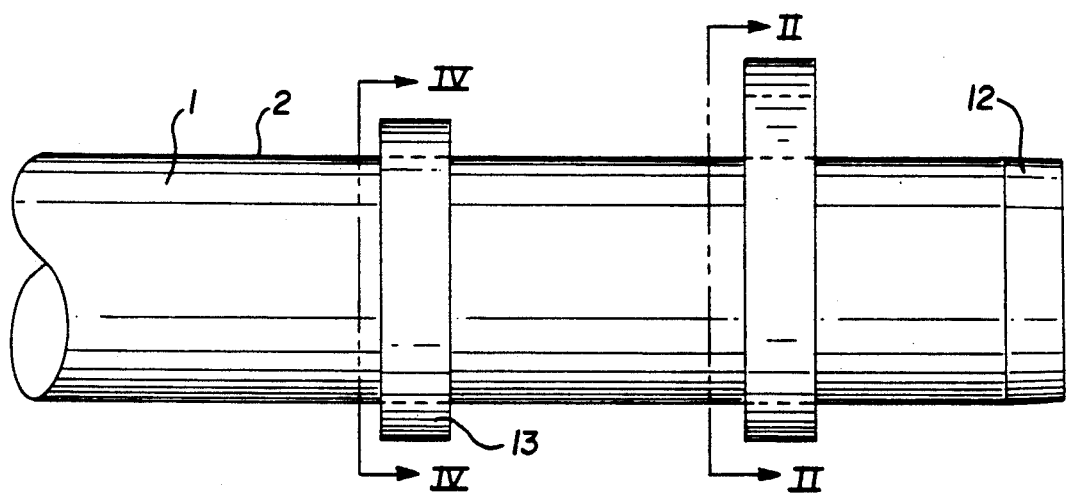
FIG. 1 is a side view of a cam shaft embodying my invention with one end broken away.
Figure 2:
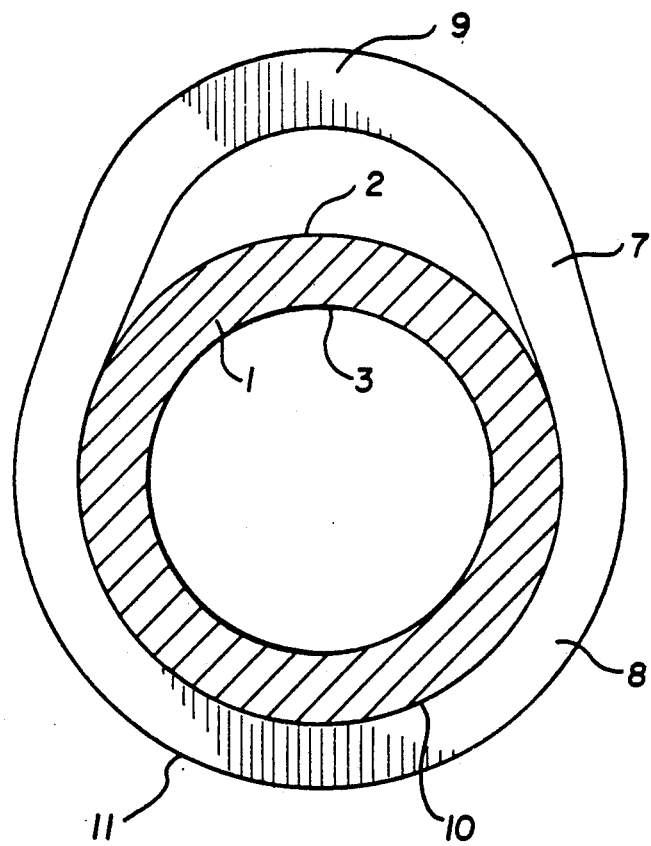
FIG. 2 is a sectional view taken along Line II—II of FIG. 1 showing a cam member mounted on the cam shaft.
Figure 3:
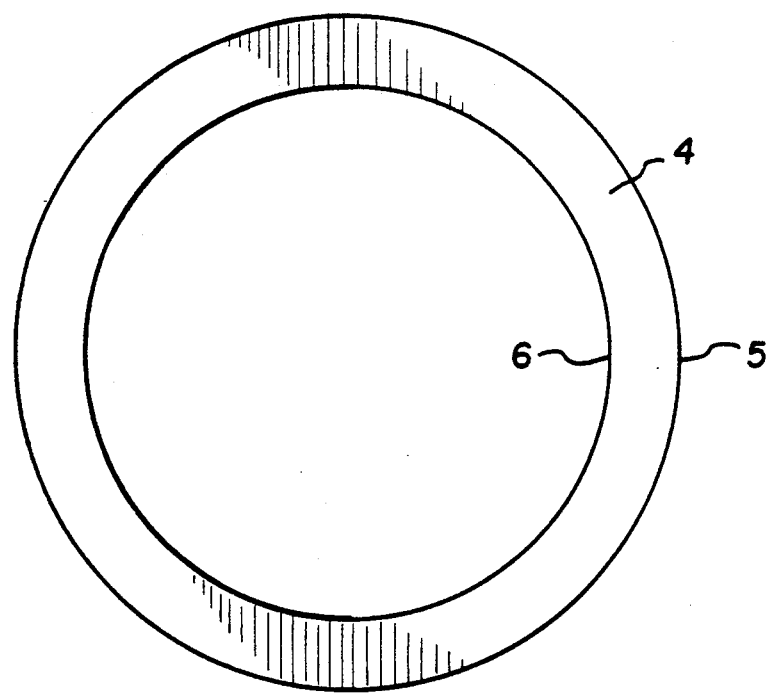
FIG. 3 is an end view of an equivalent round of cam stock prior to forming the cam section shown in FIG. 2.
Figure 4:
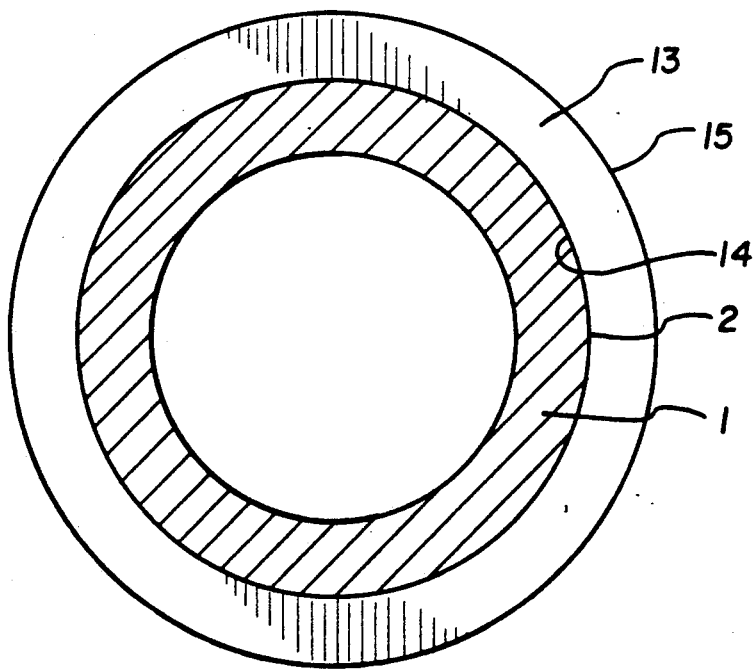
FIG. 4 is a sectional view taken along line IV—IV of FIG. 1 showing a journal member mounted on the cam member.

In a similar manner, tubing formed from a suitable steel may be drawn through a die and over a mandrel to form an equivalent round 4 having an outer diameter 5 and an inner diameter 6. Inner diameter 6 of equivalent round 4 is larger than outer diameter 2 of shaft member 1. Equivalent round 4 is then drawn through a forming die and over a mandrel to produce cam stock having a cross section as shown in FIG. 2. One or more cam members 7 are cut from the cam stock. Each cam member has a partial round section 8 and a cam lobe section 9. The circumferential dimension of cam member 7 equals the circumferential dimension of equivalent round 4 so that cam section 7 is formed essentially by reshaping the cross section of equivalent round 4. Some drawing and reduction may also be expected to occur in drawing the equivalent round through a forming die and over a mandrel.

The inner diameter 10 of partial round section 8 is fitted to the outer diameter 2 of cam member with minimum clearance consistent with assembly of the cam member on the shaft member. Shaft member 1 is placed in a fixture and cam member 7 is located in the proper position on shaft member 1 having regard to both linear and rotational positions. Additional cam members are fitted to the shaft as necessary to provide a complete cam shaft.

The outer surface 11 of cam member 7 provides the rubbing surface for a conventional cam follower. As the cam shaft rotates, cam lobe 9 will intermittently pass the follower and displace it from its normal position in which the cam follower is against surface 11 at the partial round section 8 of cam member 7.

One end of shaft member 1 is adapted to receive a timing gear which may be attached in any convenient way, e.g., by press fit or by welding, to a section 12 at one end of the shaft member.

A cylindrical sleeve or collar 13 is fitted on cam member 1 and acts as a journal for running in the cam shaft bearings. Sleeve 13 has an inner diameter 14 and an outer diameter 15. The inner diameter is closely controlled to obtain minimum clearance to the outer diameter 2 of shaft 1 consistent with assembly of the sleeve on the shaft member Outer surface 15 is desirably ground and hardened like the working surface of cam member 7. Additional sleeve members are also fitted to act as journals for the bearings needed to carry the cam shaft. Alternatively, the surface of cam member 1 may be ground and hardened in a particular zone so that the shaft member is directly journaled in the cam shaft bearings.

Preferably the cam members and sleeves are fitted to the shaft member while it is located in a fixture to ensure correct placement of the various parts. After the parts have been correctly located, they are permanently attached to form a cam shaft. The cam members may be attached to the shaft member by welding or by brazing. The sleeve members and timing gear may additionally be attached by shrink fit or by expansion of the shaft. When the members are assembled by welding or brazing, weld metal or brazing metal will be present at the joint, but those materials have been omitted from the drawings for clarity of illustration.

While I have illustrated and described certain present and preferred embodiments of my invention, it is to be understood that the invention may be otherwise variously practiced within the scope of the following claims.

I claim:

1. The method of making a cam shaft comprising
   forming shaft stock by drawing a first tube through a die and over a mandrel to form a tube having a closely controlled outside diameter,
   forming cam stock by drawing a second tube through a die and over a mandrel to form a tube having an equivalent round to the cam section,
   then drawing the second tube through a forming die and over a mandrel to form a tube having a cam cross-section including a partial inner diameter which is closely sized to the outside diameter of the shaft stock,
   positioning a length of cam stock at each place on the length of shaft stock where it is desired to have a cam, and
   permanently attaching each length of cam stock to the length of shaft stock.

2. The method of claim 1 in which the cam stock is attached to the shaft stock by welding.

3. The method of claim 1 in which the cam stock is attached to the shaft stock by brazing.

4. The method of claim 1 in which journal members are attached to the shaft stock.

* * * * *